(12) United States Patent
Subagio et al.

(10) Patent No.: US 11,895,028 B2
(45) Date of Patent: Feb. 6, 2024

(54) DESIGNATED FORWARDER SELECTION FOR MULTIHOMED HOSTS IN AN ETHERNET VIRTUAL PRIVATE NETWORK

(71) Applicant: Cisco Technology, Inc., San Jose, CA (US)

(72) Inventors: Putu H. Subagio, Cupertino, CA (US); Ravikanth Nasika, Fremont, CA (US); Saikat Bhattacharya, San Francisco, CA (US); Chih-Tsung Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/817,870

(22) Filed: Aug. 5, 2022

(65) Prior Publication Data

US 2022/0377015 A1 Nov. 24, 2022

Related U.S. Application Data

(63) Continuation of application No. 16/872,053, filed on May 11, 2020, now Pat. No. 11,411,869.

(51) Int. Cl.
*H04L 45/7453* (2022.01)
*H04L 12/46* (2006.01)
*H04L 49/00* (2022.01)
*H04L 47/125* (2022.01)

(52) U.S. Cl.
CPC ...... *H04L 45/7453* (2013.01); *H04L 12/4641* (2013.01); *H04L 47/125* (2013.01); *H04L 49/3009* (2013.01)

(58) Field of Classification Search
CPC ............ H04L 12/40–4695; H04L 45/74–748; H04L 47/12–127; H04L 49/30–309
See application file for complete search history.

(56) References Cited

U.S. PATENT DOCUMENTS

| | | | |
|---|---|---|---|
| 8,988,984 B2 * | 3/2015 | Marques | H04L 45/28 370/219 |
| 9,716,592 B1 * | 7/2017 | Mandal | H04L 45/245 |
| 9,992,103 B2 * | 6/2018 | Bosch | H04L 45/38 |
| 10,355,981 B1 * | 7/2019 | Matthews | H04L 47/6215 |
| 11,134,032 B1 * | 9/2021 | Bas | H04L 49/40 |
| 11,356,369 B1 * | 6/2022 | Loganathan | H04L 69/28 |
| 11,385,996 B1 * | 7/2022 | Bartling | G06F 11/3466 |
| 2004/0083347 A1 * | 4/2004 | Parson | G06F 16/9014 707/E17.036 |
| 2010/0188412 A1 * | 7/2010 | Li | G06T 1/60 345/557 |
| 2012/0177054 A1 * | 7/2012 | Pati | H04L 12/4625 370/395.53 |

(Continued)

*Primary Examiner* — Chi H Pham
*Assistant Examiner* — Vladislav Y Agureyev
(74) *Attorney, Agent, or Firm* — Patterson + Sheridan, LLP

(57) ABSTRACT

Embodiments for handling multidestination traffic in a network are described. The multidestination traffic includes packets that are in transit to a multihomed destination in the network. Upon determining the destination is multihomed, a network switch determines a hash value from a selection of header values in the network traffic and uses the hash value to determine if the network switch is a designated forwarder for the multihomed destination. The network switch handles the network traffic according to a designated forwarder status.

17 Claims, 5 Drawing Sheets

(56) References Cited

U.S. PATENT DOCUMENTS

| | | | | |
|---|---|---|---|---|
| 2012/0201124 | A1* | 8/2012 | Marques | H04L 45/04 |
| | | | | 370/221 |
| 2012/0307628 | A1* | 12/2012 | Maeda | H04L 41/5022 |
| | | | | 370/445 |
| 2013/0103694 | A1* | 4/2013 | Luong | H04L 67/1065 |
| | | | | 707/769 |
| 2013/0336164 | A1* | 12/2013 | Yang | H04L 47/125 |
| | | | | 370/255 |
| 2017/0012874 | A1* | 1/2017 | Lee | H04L 45/56 |
| 2017/0149882 | A1* | 5/2017 | Roy | H04L 45/02 |
| 2017/0272329 | A1* | 9/2017 | Bennett | H04L 41/12 |
| 2018/0041470 | A1* | 2/2018 | Schultz | H04L 63/0263 |
| 2018/0109454 | A1* | 4/2018 | Holmberg | H04L 45/748 |
| 2018/0287946 | A1* | 10/2018 | Nagarajan | H04L 12/1877 |
| 2018/0331941 | A1* | 11/2018 | Singh | H04L 45/66 |
| 2019/0140956 | A1* | 5/2019 | Shen | H04L 45/7453 |
| 2019/0236161 | A1* | 8/2019 | Roy | G06F 3/0608 |
| 2019/0281113 | A1* | 9/2019 | Preston | H04L 45/54 |
| 2019/0288946 | A1* | 9/2019 | Gupta | H04L 45/38 |
| 2020/0007653 | A1* | 1/2020 | Bichot | H04L 69/14 |
| 2020/0067882 | A1* | 2/2020 | Chapel | H04L 63/0236 |
| 2020/0249874 | A1* | 8/2020 | Foo | G06F 3/0631 |
| 2020/0280592 | A1* | 9/2020 | Ithal | H04L 67/1001 |
| 2021/0165762 | A1* | 6/2021 | Chan | G06F 16/2255 |
| 2021/0368009 | A1* | 11/2021 | Gopinath | H04L 67/142 |
| 2021/0385155 | A1* | 12/2021 | Suryanarayana | H04L 45/02 |

* cited by examiner

DESIGNATED FORWARDER SELECTION FOR MULTIHOMED HOSTS IN AN ETHERNET VIRTUAL PRIVATE NETWORK

CROSS-REFERENCE TO RELATED APPLICATIONS

This application is a continuation of co-pending U.S. patent application Ser. No. 16/872,053 filed May 11, 2020. The aforementioned related patent application is herein incorporated by reference in its entirety.

TECHNICAL FIELD

Embodiments presented in this disclosure generally relate to network traffic routing and handling in a network fabric. More specifically, embodiments disclosed herein relate to methods and systems for efficiently handling multidestination traffic at a provider edge switch in a network fabric.

BACKGROUND

As modern network landscapes convert to cloud based models, cloud network providers often utilize the same network infrastructure (e.g., same network hardware, etc.) to provide cloud network services to multiple tenants or customers. Cloud network providers with multiple tenants must provide secure and compartmentalized communication to each tenant to prevent data breaches and unauthorized access to data and network traffic across the tenants. Many cloud providers utilize virtual private networks (VPNs) in their cloud based network infrastructure which enables placement of multi-tenant networking and computing anywhere inside and outside a data center and network fabric. However, VPNs require large amounts of network resources and are difficult to scale up as the number of network hosts and devices are connected.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
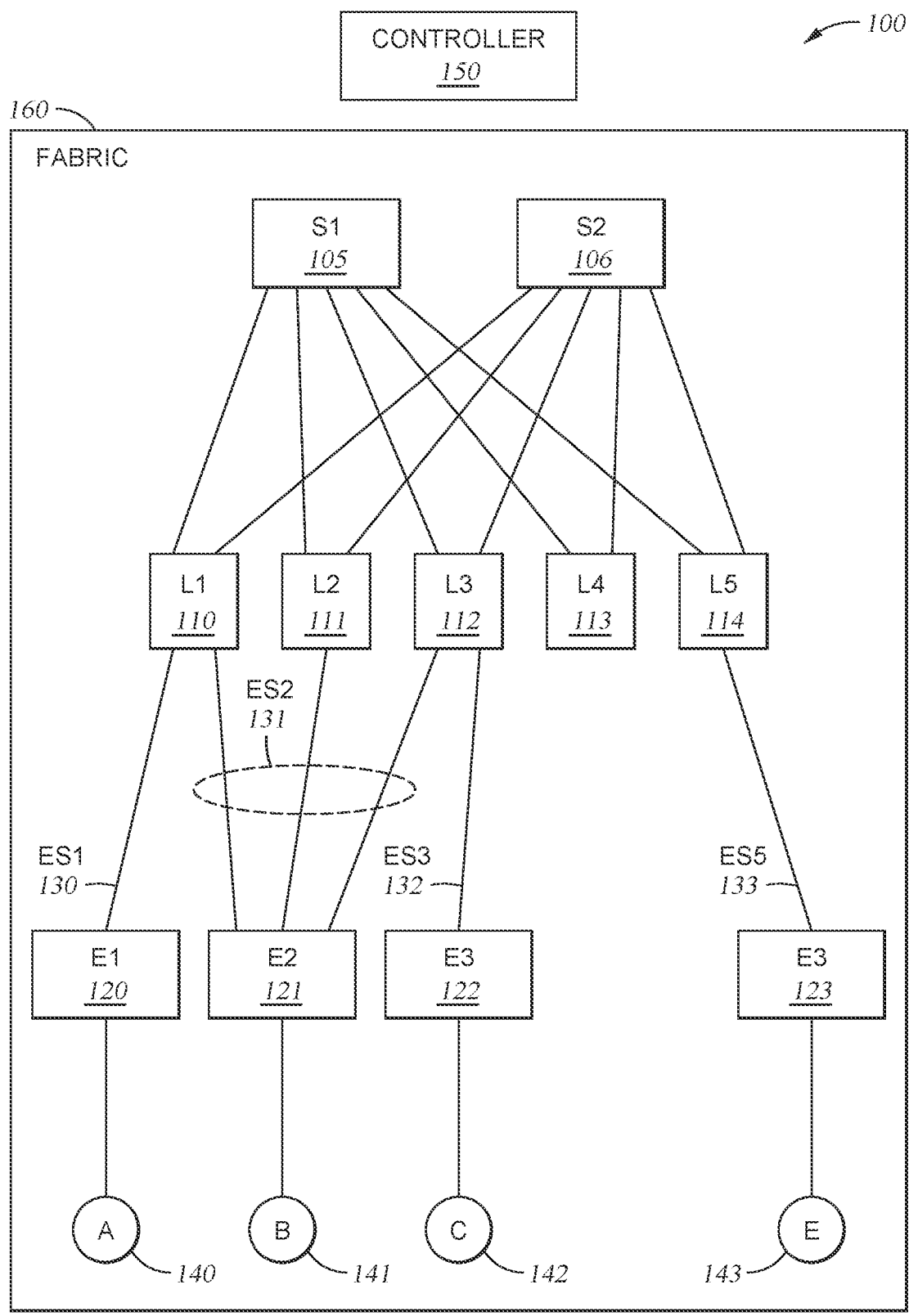
FIG. 1 illustrates a network, according to one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example embodiment includes a method. The method includes receiving a multidestination packet at a network switch; determining a destination for the multidestination packet; determining the destination is a multihomed destination; determining a hash value from a selection of header values of the multidestination packet; determining a designated forwarding status for the network switch from a hash forwarding table; and when the network switch is a designated forwarder for the multidestination packet, forwarding the multidestination packet to the destination. Other embodiments of this aspect include corresponding computer systems, apparatus, and computer programs recorded on one or more computer storage devices, each configured to perform the actions of the methods.

One example embodiment includes a computer program product a computer-readable storage medium having computer-readable program code embodied therewith, the computer-readable program code executable by one or more computer processors to perform an operation. The operation may include: receiving a multidestination packet at a network switch; determining a destination for the multidestination packet; determining the destination is a multihomed destination; determining a hash value from a selection of header values of the multidestination packet; determining a designated forwarding status for the network switch from a hash forwarding table; and when the network switch is a designated forwarder for the multidestination packet, forwarding the multidestination packet to the destination.

One example embodiment includes a system. The system includes a processor; and a memory may include instructions which, when executed on the processor, performs an operation. The operation may include: receiving a multidestination packet at a network switch; determining a destination for the multidestination packet; determining the destination is a multihomed destination; determining a hash value from a selection of header values of the multidestination packet; determining a designated forwarding status for the network switch from a hash forwarding table; and when the network switch is a designated forwarder for the multidestination packet, forwarding the multidestination packet to the destination.

Example Embodiments

As described above, as modern network landscapes convert to cloud based models, cloud network providers with multiple tenants provide secure and compartmentalized communication to each tenant using virtual private networks (VPNs). VPNs, however, often require large amounts of network resources and are difficult to scale up as the number of network hosts and devices are connected.

Furthermore, current VPN technologies such as virtual port-channel (VPC) support Active-Active redundancy where multiple switches in the network are actively running the same services simultaneously. However, in order to fully utilize all the active switches, an active-active group uses load balancing such as VPC to distribute workloads across the switches, but traffic handling in VPC is limited to a pair of switches in a network, limiting its ability to scale up as network fabrics grow larger.

Furthermore, using Multiprotocol Label Switching (MPLS) multipoint Layer 2 VPN (L2VPN) and/or Virtual Private LAN Switching (VPLS) at larger and larger scales can lead to wasted network resources (e.g., bandwidth) due to Active-Standby connectivity. These drawbacks have led VPN and cloud providers to increasingly utilize Ethernet VPN (EVPN) protocols for multi-point transport solutions. EVPN enables flexible multihoming through Active-Active links between Provider Edge (PE) and Customer Edge (CE) devices/switches, which is not permitted by traditional VPC and MPLS L2VPN/VPLS.

The increasing adoption of EVPN by Cloud service provider (SP) data centers (and data center interconnects) has also created significant scaling challenges for switches and routers to efficiently and effectively utilize and balance traffic across links in a multihomed environment, while maintaining packet order in a given flow.

The embodiments described herein provide for efficient handling of multidestination traffic in EVPN using a hashing function to determine a designated forwarder among several options for a multihomed host. This allows for an efficient method of compute anywhere connectivity through EVPN n-way Active-Active multihoming, achieving both unicast and multicast in-order packet delivery per flow, across fully utilized and load balanced links.

Note that while many of the following embodiments are discussed with reference to a spine-leaf architecture in a simplified data center topology/network fabric using an EVPN configuration, the techniques discussed herein are not limited to the spine-leaf architecture or EVPN. The techniques may be extended to any network architecture and configuration in which access network devices communicate with each other via multiple core network devices providing redundancy in terms of the path a data flow may take between two access network devices.

FIG. 1 illustrates a network 100, according to one embodiment. The network 100 may illustrate a simplified data center topography with 5 leaf switches (e.g., L1 110-L5 114), 2 spine switches (e.g., S1 105 and S2 106), and a controller 150. The network 100 also includes four customer switches (e.g., E1 120-E5 123) connected to the leaf switches (e.g., L1 110-L5 114). Network 100 also includes hosts A 140, B 141, C 142, and E 143. The hosts A 140, B 141, and C 142 are attached to E1 120, E2 121, and E3 122 respectively.

In some embodiments, the network 100 may be implemented as a Clos or Software Defined Network (SDN). The Clos fabric includes a leaf-spine architecture similar to the leaf-spine fabric of fabric 160 shown in FIG. 1. From a management perspective, the controller 150 (e.g., SDN controller) of the CLOS fabric manages and configures the policy on each of the switches in the CLOS fabric, including the hash methods and hash forwarding tables described herein. The controller 150 acts as a central repository for all policies and has the ability to rapidly deploy and re-deploy hardware and policies, as needed, based on network performance and network configuration changes.

The CLOS network may also serve as a platform for other services that are performed within the data center or cloud environment. For example, through the use of the controller 150, third party services may be integrated for advanced security, load balancing, and monitoring. Note that CLOS network is merely used as an example. The embodiments herein are not limited to such and can be used with any other suitable SDN platform.

As described herein, the network 100 supports multidestination traffic between a source/host and multiple destinations. As an example, the multidestination traffic can include tenant multicast traffic, broadcast traffic (e.g., Address Resolution Protocol (ARP)/gratuitous ARP (GARP) traffic), and unknown unicast traffic (e.g., for endpoint learning, forwarding to silent hosts, etc.).

In some examples, the topology of network 100 shown in FIG. 1 is a service provider EVPN environment where E1 120 to E5 123 are customer edge (CE) devices, and L1 110 to L5 114 are provider edge (PE) devices in the provider network fabric, such as the fabric 160. The PE devices are connected to the CE devices by Ethernet segments (ES) which are defined as a link between a PE device and a CE device.

EVPN Multihoming access gateway enables redundant network connectivity by allowing a CE device to connect to more than one PE device. Disruptions to the network connectivity are prevented by allowing a CE device to be connected to a PE device or several PE devices through multihoming. An ES is the group of Ethernet links through which a CE device is connected to more than one PE devices. In all-active multihoming scenarios, when multihop is configured to the same destination, the access side device load balances traffic on the access side and the PEs load balance traffic to remote PEs on the core side.

Example ES's in FIG. 1 include ES1 130 connecting E1 120 to L1 110, ES2 connecting E2 to L1 110, L2 111, and L3 112. Further, ES3 132 and ES5 133 connect E3 122 to L3 112 and E5 123 to L5 114, respectively.

A CE device can be single homed with one link in an ES (e.g., E1 120, E3 122, and E5 123 are single homed CEs) or multihomed with multiple links in an ES (e.g., E2 121). Multihoming poses a challenge for multidestination packets arriving at the PE devices connected to a multihomed CE device. A primary challenge is on the selection of one PE device to deliver the packet to the CE, while providing load balancing across the ES and without causing packet reordering or duplication. In EVPN networks such as the network 100, the selection process of the PE to deliver the packet is commonly referred to as designated forwarder (DF) election.

In current implementations, large amounts of computing resources are used to handle multidestination traffic at the PEs in EVPNs. In an example where hosts A 140, B 141, C 142, and E 143 belong to a same virtual local area network (VLAN), host E 143 may send a multidestination packet (e.g., an Address Resolution Protocol (ARP) packet) to be delivered to host A 140, host B 141, and host C 142. In some examples, PE switch L5 114 receives the multidestination packet from E5 123, encapsulates the packet, and sends three copies to L1, L2, and L3 respectively to transmit to each host in the VLAN.

Current EVPN protocols, such as Internet Engineering Task Force Request for Comments (RFC) 7432, recommend a per <ES, VLAN> or per <ES, VLAN bundle> based DF election. This implies that the computing resources on the PE devices, such as application-specific integrated circuit (ASICs) on the various PEs need to support a per-port, per-VLAN DF election. For network switch ASICs that support 16000 bridge domains (BDs) (e.g., stretched VLANs), to perform DF election as recommended by RFC 7432, the ASIC requires a table with the number of bits equal to: 16000*(number of ports). For a 51.2 terabyte per second (Tbps) switch, this is equivalent to an 8 Million bit table (equivalent to 1 Megabyte of buffer lost), which can utilize large amounts of the computing resources of the PE switch. Furthermore, the number of ports in switching ASICs continues to increase which will exacerbate the resource utilization problem going forward. As described in relation to FIGS. 2-6, the method and systems herein provide for a DF election that does not require large amounts of computing and network resources.

Figure 2:
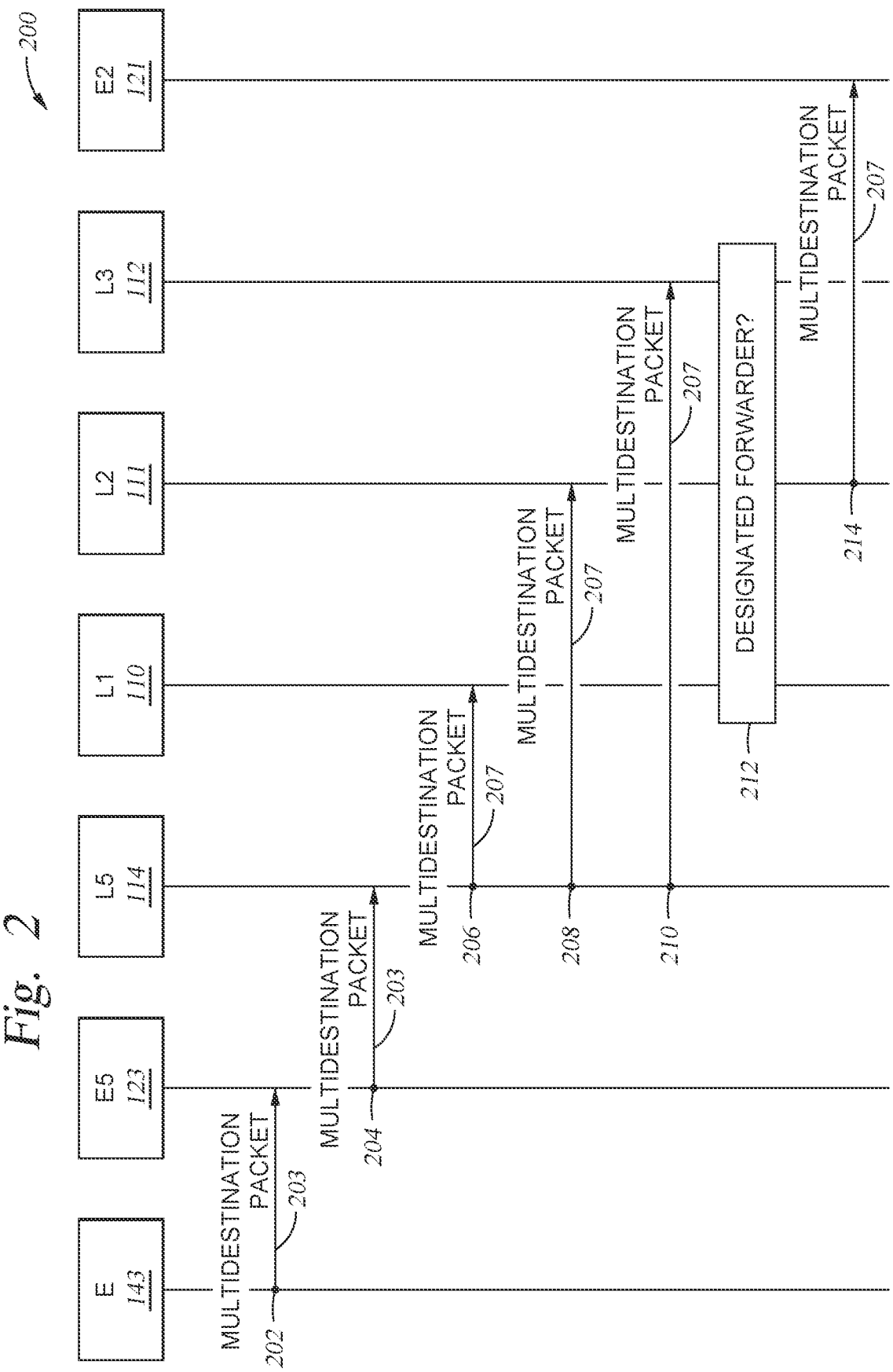
FIG. 2 depicts a system flow diagram for designated forwarder selection, according to one embodiment.

FIG. 2 depicts a system flow diagram for designated forwarder selection, according to one embodiment. The system flow 200 begins at step 202 and is similar to the example described above in relation to FIG. 1 where the host E 143 transmits a multidestination packet 203 to the E5 123 which in turn transmits the multidestination packet 203 to the L5 114 at step 204. The L5 114 receives the multidestination packet 203 from E5 123 and at steps 206, 208, and 210 encapsulates the packet, and sends three copies of the packet 207 to L1 110, L2 111, and L3 112, respectively, to transmit to each host in the VLAN (e.g., hosts A 140, B 141, and C 142). For the hosts A 140 and C 142, a received pack is simply forwarded via the ES1 130 and ES3 132 since these are single homed hosts/links and packet duplication is not possible.

However, for the ES2 132, there are multiple possible forwarding switches, at step 212, the PE devices L1 110, L2 111, and L3 112 each compute a hash function and determine from a hash forwarding table on each switch, if the respective switch is the DF for the packet 207. In this example, the L2 111 is the DF and forwards the packet 207 to the E2 121 for delivery to the B 141. The determination of which PE device is the DF is discussed in more detail in relation to the methods of FIGS. 3-5.

Figure 3:
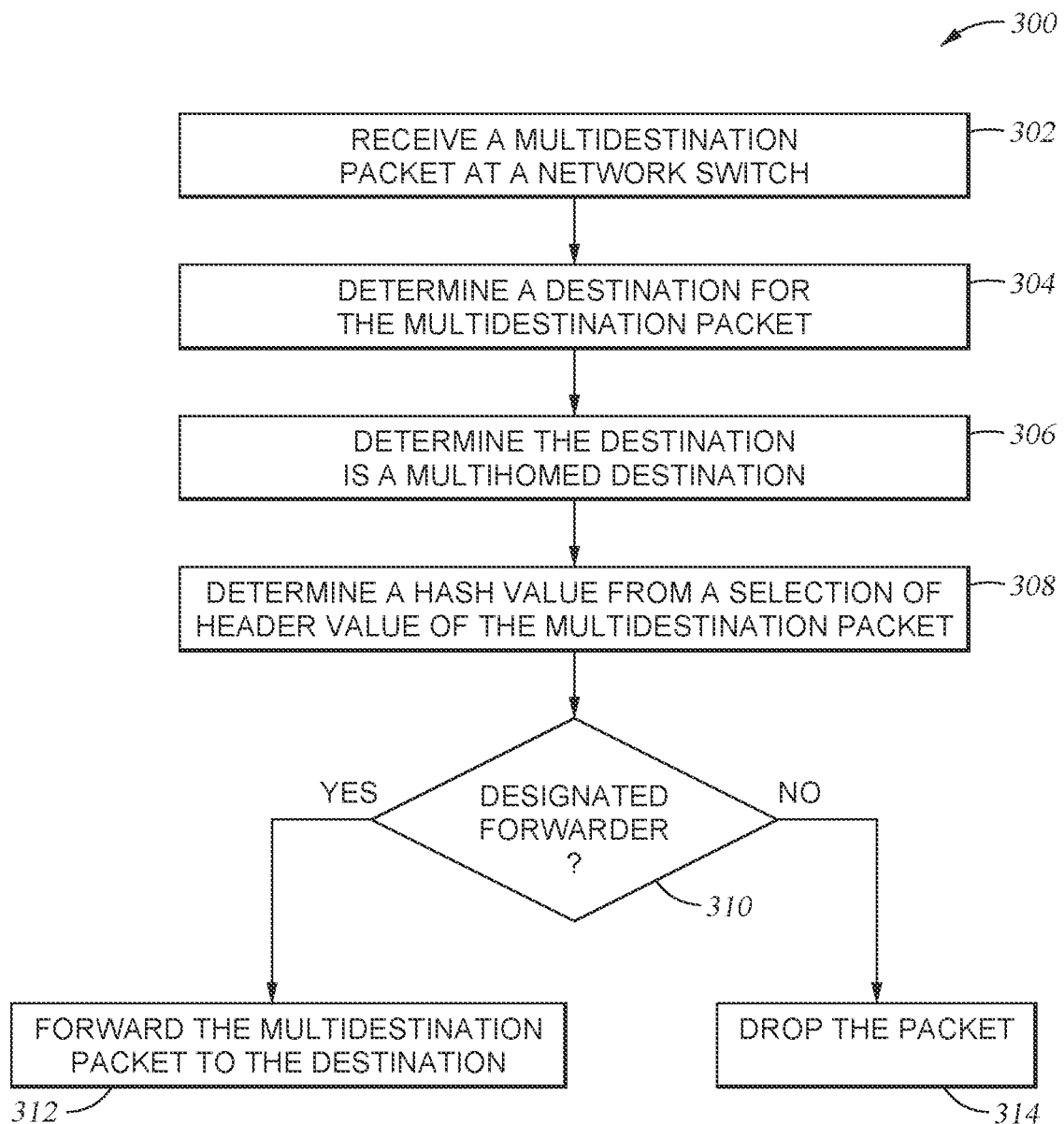
FIG. 3 depicts a method for designated forwarder selection, according to one embodiment.

FIG. 3 depicts a method 300 for designated forwarder selection, according to one embodiment. For ease of discussion, method 300 will be discussed as being performed by the PE leaf switch L2 111, but may also be performed by any PE device/switch in the network 100. At block 302, the L2 111, receives a multidestination packet at the network switch. For example, as shown at step 208 in FIG. 2, the L2 111 receives the encapsulated multidestination packet 207. In some examples, the packet 207 is received via one or more of the spine switches S1 105 and S2 106, where the packet is encapsulated by a ingress PE switch in the fabric 160 (e.g., the L5 114).

At block 304, the L2 111 determines a destination for the multidestination packet. For example, the L2 111 determines from packet header information for the multidestination packet that the destination is host B 141 via the CE switch, E2 121 and ES2 131. In some examples, the L2 111 determines the destination for the multidestination packet based on the header information and/or other information received with the packet.

At block 306, the L2 111 determines the destination is a multihomed destination. For example, the L2 111 determines that the E2 131 is a multihomed switch and that the ES2 121 includes links to multiple other PE switches in the fabric 160. In this example, simply forwarding the packet without determining/selecting a DF will cause duplicate packets in the network and cause looping and other types of errors between the provider network fabric, e.g., fabric 160, and the customer devices, which will decrease network performance. In an example where the destination for the packet is not a multihomed destination, the PE switch can forward the packet without performing a hash determination for the DF. In an example where a DF is needed, the L2 111 performs a hash function for the packet in order to determine a DF status.

For example, at block 308 the L2 111 determines a hash value from a selection of header values of the multidestination packet. For example, the hash value may be an 8-bit value calculated based on a 5-tuple flow information and a VLAN identification for the multidestination packet. For example, the hash value is calculated by a hash function using values for source IP address/port number, destination IP address/port number, and a protocol in use for the packet. In some examples, the identification of the VLAN such as the BD identification is also used to calculate the hash value. Since this hash value is calculated independently and simultaneously at each PE in the network that receive the multidestination packet, the hash values should be calculated in a same method or using a same hash function at each PE device. For example at each of the L1 110, L2 111, and L3 112, the hash function is similar such that the DF can be determined without communication between the PE devices. In some examples, the hash function is customizable by the service provider of the fabric 160 and/or the customer. For example, which fields of the header are used to calculate the hash value can be set by the service provider and/or the customer to provide varying levels of granularity in determining the DF status for a packet.

At block 310, the L2 111 determines a designated forwarding status for the network switch from a hash forwarding table. For example, the L2 111 uses the hash value calculated at block 308 and compares it to a hash table stored on the switch. When the table indicates that the L2 111 is the DF for the hash value and the multidestination packet, the L2 111 forwards the multidestination packet to the destination at block 312. For example, the L2 111 forwards the packet 207 to the E2 121 at step 214 of FIG. 2. In another example, when the table indicates that the L2 111 is not the DF for the hash value and the multidestination packet, the L2 111 drops the multidestination packet to avoid duplicate packets at the E2 121 at block 314.

In some examples, the hashing method and the hash forwarding table are provided to the PE switches in the network 100 by the controller 150 in order to provide consistent hashing values and DF selection. In some examples, the hash forwarding table at the PE switches provides load balancing for the network by load balancing between network switches connected to the multihomed destination. For example, the controller 150 may determine hash values and assign the DF for various links based on expected load across various VLANs and links in the network 100, such that the PE switches provide the load balancing by utilizing the hash tables provided by the controller. In some examples, the PE switches also provide for updating the DF selections and hashing information in the forwarding tables in communication with the controller 150 as described in relation to FIGS. 4-5.

Figure 4:
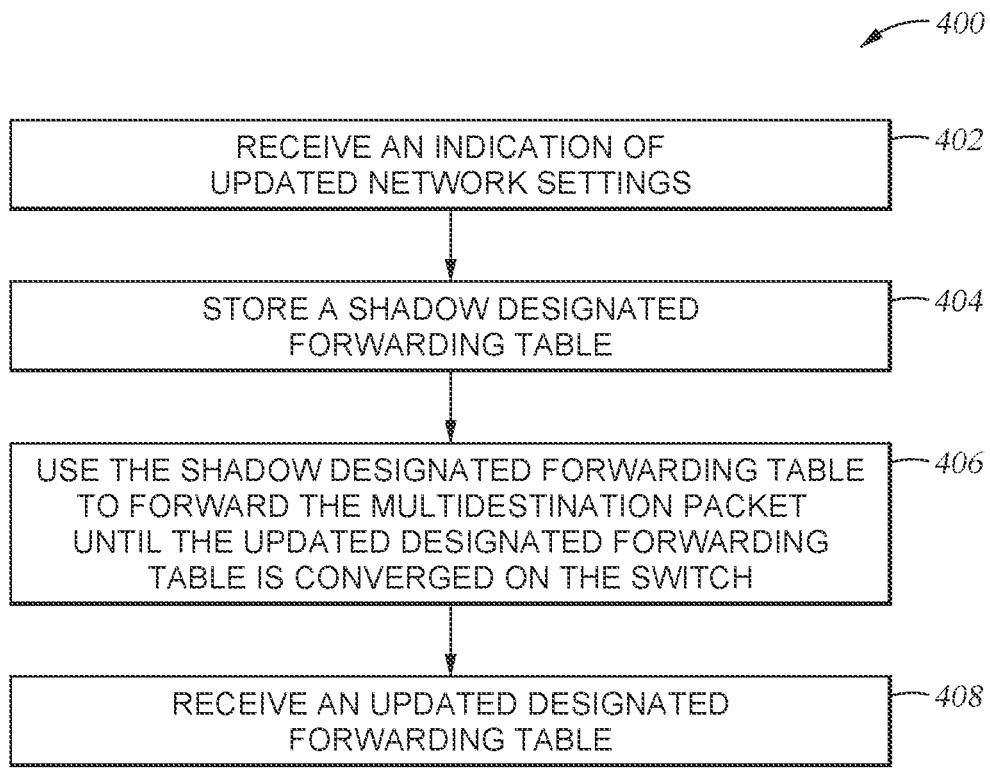
FIGS. 4-5 are methods for updating a designated forwarder in a network, according to one embodiment.

FIG. 4 is a method for updating a designated forwarder in a network, according to one embodiment. Method 400 begins at block 402 where the L2 111 receives an indication of updated network settings from the controller 150. In some examples, this may include an indication that additional hosts and/or CE switches have been added to the network 100. The controller 150 is generally responsible for reconfiguring policies in the PEs in the event of topology changes (e.g., link failures, switch/host additions, switch/host removals, etc.). However, when a link (e.g., between a leaf and spine) in the fabric fails (or, in general, satisfies a predetermined condition, such as having a link quality below within a threshold), multi-destination traffic traversing the network may fail to reach its destination. This condition results in a loss of packets until the controller 150 achieves convergence via the control plane (e.g., via application and/or software fixes).

For example, the controller 150 (e.g., in the control plane) generally is responsible for disabling the multi-destination routes associated with the failed link from the entire spine-leaf fabric. During this down-time (e.g., on the order of several hundred milliseconds), several packets can be dropped, reducing the data center utilization and significantly impacting application performance. In some examples, the delay between the implementation of a new network configuration and the convergence of the network configuration across the network components. For example, a host may be added or removed and the L2 111 may be informed of the update while waiting for final network convergence indication from the controller 150.

At block 404, the L2 111 stores a shadow hash forwarding table. In some examples, the switches L1 110, L2 111, and L3 112 should be in sync with respect to a DF state per ES, per VLAN in the network. When an increase or decrease in the number of BD's in the network is detected, the DF selection for the switches may dynamically change in order to achieve a more efficient load balance. The ASICs at the various switches handle this change without any packet duplication to a CE by maintaining an alternate (shadow) DF state. One or more shadow tables are maintained at the various switches where the one or more shadow tables enable cloud service providers to facilitate desired service level agreements and quality of service (e.g. tiered service such as bronze, silver, gold) reaction time. For example, the L2 111 stores the hash forwarding table in current use at the time of the indication as the shadow hash forwarding table. This allows for the L2 111 to utilize the shadow hash forwarding table to forward multidestination packets on good links until the updated hash forwarding table is converged on the network switch at block 406. For example, the L2 111 continues to use the shadow hash forwarding table for any links or ES that are continuing to function while waiting for an updated hash forwarding table.

At block 408, the L2 111 receives an updated hash forwarding table and utilizes the updated hash forwarding table to determine the DF status for received network traffic. For example, once the network controller has determined a new hash forwarding table and hash function for the network, the controller 150 forwards the updated hash forwarding table and function to the PE devices/switches. Accordingly, by allowing each PE device to utilize a shadow has forwarding table a given multi-destination packet to forward packets over functioning links, embodiments can achieve localized convergence without dropping packets, while the control plane removes the disabled multi-destination links from the entire fabric.

Figure 5:
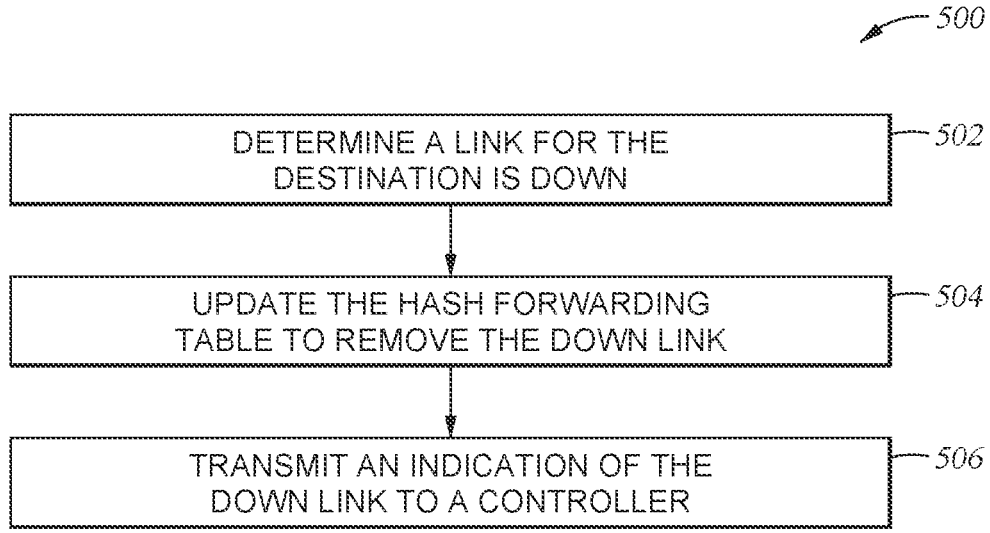

FIG. 5 is a method for updating a designated forwarder in a network, according to one embodiment. Method 500 begins at block 502 where the L2 111 determines a link for the destination is down. In some examples, a determination that the link is down is based on histogram of link conditions. For example, a single or aggregate histogram of link conditions can track conditions (e.g., using an average, a maximum, a minimum, etc.) such as hardware error count, packet count, byte count, programmable field match, etc. In some examples, an accurate determination of a link down and mitigation of false link down situations augments a criticality of uptime. The histogram and other forms of data collection and statistics can be analyzed on the ASIC on the switch and/or exported to the controller 150 to perform the various calculations and combine hardware monitored data with global policy programming to propagate any determinations of the link and network conditions across the network 100. In some examples, the export of collected data can be formation of in band insertion to existing transmitted packets, of out of band newly formed packets with a user configured Ethernet and/or IP header, or a register read from onboard CPU/processor to do local instantaneous analysis. In some examples, received export data is used for derived analyzed data that is used to populate one and each of shadow tables according to global policy controllers.

At block 504, the L2 111 updates the hash forwarding table to remove the down link. For example, the L2 111 may determine that the link between the L2 111 and the E2 121 is not functioning correctly. In this example, the L2 111 cannot function as the DF for the ES2 and thus removes the link from the hash forwarding table and prevents transmitting the packet via the downed link.

At block 506, the L2 111 transmits an indication of the down link to a controller. For example, the L2 111 transmits a down link indication to the controller 150 to initiate an updated hashing function and table for the network 100 to account for the downed link.

Figure 6:
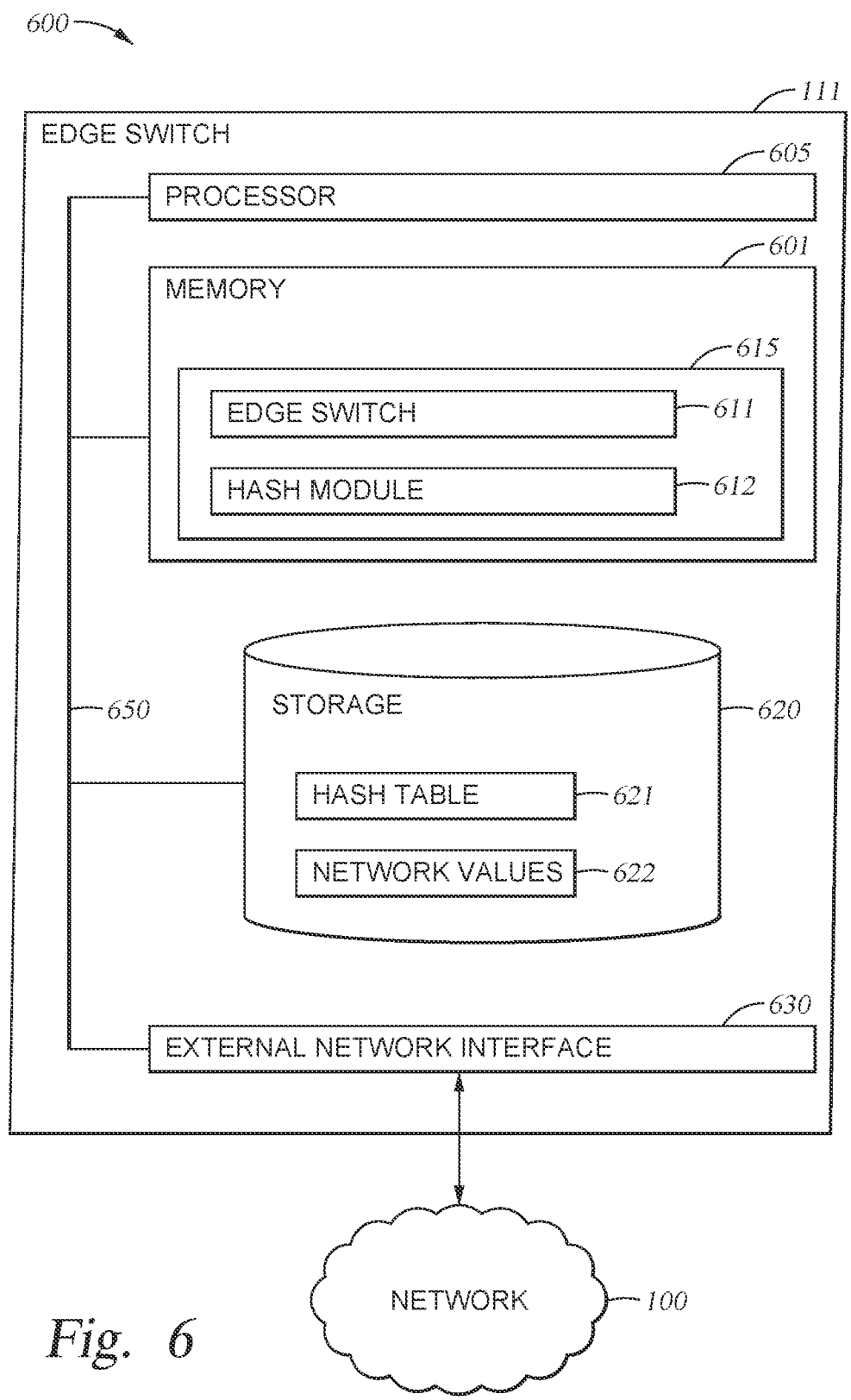
FIG. 6 is a block diagram of a network switch, according to one embodiment described herein.

FIG. 6 is a block diagram of a network switch, according to one embodiment described herein. As shown in FIG. 6, the arrangement 600 may include the switch L2 111 (or any other PE switch described herein) configured to execute the various functions of the interfaces described herein. The L2 111 is shown in the form of a general-purpose computing device, but may include a server, switch, and/or application executing on a cloud network. The components of L2 111 may include, but are not limited to, one or more processors (or processing units) 605, a system memory 610, a storage system 620, network interface 630 connecting the L2 111 to network 100 and, in turn, the fabric 160 and the CE switches, and a bus 650 that couples various system components including the system memory 610 and storage system 620 to processors 605 along with various input/output components (not shown). In other embodiments, arrangement 600 is distributed and includes a plurality of discrete computing devices that are connected through wired or wireless networking.

Bus 650 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

L2 111 typically includes a variety of computer system readable media. Such media may be any available media that is accessible by L2 111, and it includes both volatile and non-volatile media, removable and non-removable media.

System memory 610 can include computer system readable media in the form of volatile memory, such as random access memory (RAM) and/or cache memory. The L2 111 may further include other removable/non-removable, volatile/non-volatile computer system storage media. By way of example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 650 by one or more data media interfaces. As will be further depicted and described below, memory 610 may include at least one program product having a set (e.g., at least one) of program modules that are configured to carry out the functions of various embodiments described herein.

L2 111 may further include other removable/non-removable, volatile/non-volatile computer system storage media. In some examples storage system 620 may be included as part of memory 610 and may typically provide a non-volatile memory for the networked computing devices, and may include one or more different storage elements such as Flash memory, a hard disk drive, a solid state drive, an optical storage device, and/or a magnetic storage device. For example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 650 by one or more data media interfaces. Storage 620 may include media for hash forwarding table 621, network information 622, and other information stored for access and use by the L2 111.

Memory 610 may include a plurality of modules 615 for performing various functions described herein. The modules 615 generally include program code that is executable by one or more of the processors 605. As shown, modules 615 include traffic module 611 and hash module 612. The modules 615 may also interact with each other and storage system 620 to perform certain functions as described herein. For example, the traffic module 611 and hash module 612 perform the methods as described in relation to FIGS. 2-5

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method comprising:
receiving an indication of updated network settings for a network at a network switch;
storing a shadow hash forwarding table at the network switch by storing a hash forwarding table in current use at a time of the indication as the shadow hash forwarding table; and
forwarding a multidestination packet to a destination in the network using the shadow hash forwarding table.

2. The method of claim 1, further comprising:
receiving an updated hash forwarding table; and
using the shadow hash forwarding table to forward the multidestination packet until the updated hash forwarding table is converged on the network switch.

3. The method of claim 1 further comprising:
determining a hash value from a selection of header values of the multidestination packet using a hash function;
determining, using the hash value, a designated forwarding status for the network switch from a hash forwarding table; and
when the network switch is a designated forwarder for the multidestination packet according to the designated forwarding status, forwarding the multidestination packet to the destination.

4. The method of claim 3, wherein the hash value is determined using a same hash function by each edge device connected to the destination, and wherein the hash value is an 8-bit value calculated based on a 5-tuple flow information and a VLAN for the multidestination packet.

5. The method of claim 3, wherein the hash forwarding table provides load balancing for a network by load balancing between network switches connected to the destination.

6. The method of claim 1, further comprising:
determining a link for the destination is down;
updating a hash forwarding table to remove the down link; and
transmitting an indication of the down link to a controller.

7. A computer program product, the computer program product comprising:
a computer-readable storage medium having computer-readable program code embodied therewith, the computer-readable program code executable by one or more computer processors to perform an operation, the operation comprising:
receiving an indication of updated network settings for a network at a network switch;
storing a shadow hash forwarding table at the network switch by storing a hash forwarding table in current use at a time of the indication as the shadow hash forwarding table; and
forwarding a multidestination packet to a destination in the network using the shadow hash forwarding table.

8. The computer program product of claim 7, wherein the operation further comprises:
receiving an updated hash forwarding table; and
using the shadow hash forwarding table to forward the multidestination packet until the updated hash forwarding table is converged on the network switch.

9. The computer program product of claim 7, wherein the operation further comprises:
- determining a hash value from a selection of header values of the multidestination packet using a hash function;
- determining, using the hash value, a designated forwarding status for the network switch from a hash forwarding table; and
- when the network switch is a designated forwarder for the multidestination packet according to the designated forwarding status, forwarding the multidestination packet to the destination.

10. The computer program product of claim 9, wherein the hash value is determined using a same hash function by each edge device connected to the destination, and wherein the hash value is an 8-bit value calculated based on a 5-tuple flow information and a VLAN for the multidestination packet.

11. The computer program product of claim 9, wherein the hash forwarding table provides load balancing for a network by load balancing between network switches connected to the destination.

12. The computer program product of claim 7, wherein the operation further comprises:
- determining a link for the destination is down;
- updating a hash forwarding table to remove the down link; and
- transmitting an indication of the down link to a controller.

13. A system comprising:
- a processor; and
- a memory comprising instructions which, when executed on the processor, performs an operation, the operation comprising:
  - receiving an indication of updated network settings for a network at a network switch;
  - storing a shadow hash forwarding table at the network switch by storing a hash forwarding table in current use at a time of the indication as the shadow hash forwarding table; and
  - forwarding a multidestination packet to a destination in the network using the shadow hash forwarding table.

14. The system of claim 13, wherein the operation further comprises:
- receiving an updated hash forwarding table; and
- using the shadow hash forwarding table to forward the multidestination packet until the updated hash forwarding table is converged on the network switch.

15. The system of claim 13, wherein the operation further comprises:
- determining a hash value from a selection of header values of the multidestination packet using a hash function;
- determining, using the hash value, a designated forwarding status for the network switch from a hash forwarding table; and
- when the network switch is a designated forwarder for the multidestination packet according to the designated forwarding status, forwarding the multidestination packet to the destination.

16. The system of claim 15, wherein the hash value is determined using a same hash function by each edge device connected to the destination, and wherein the hash value is an 8-bit value calculated based on a 5-tuple flow information and a VLAN for the multidestination packet.

17. The system of claim 15, wherein the hash forwarding table provides load balancing for a network by load balancing between network switches connected to the destination.

* * * * *